United States Patent
Kondo

(10) Patent No.: US 6,816,772 B2
(45) Date of Patent: Nov. 9, 2004

(54) ELECTRONIC THROTTLE CONTROL SYSTEM HAVING OPERATION MONITOR

(75) Inventor: Hiroshi Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 23 days.

(21) Appl. No.: 10/298,581

(22) Filed: Nov. 19, 2002

(65) Prior Publication Data

US 2003/0163241 A1 Aug. 28, 2003

(30) Foreign Application Priority Data

Feb. 28, 2002 (JP) ........................................ 2002-054089

(51) Int. Cl.[7] .............................................. F02D 41/22
(52) U.S. Cl. ........................ 701/103; 701/114; 701/115; 123/361; 123/399
(58) Field of Search ................................ 701/103, 114, 701/115, 107; 123/399, 361, 396

(56) References Cited

U.S. PATENT DOCUMENTS

| | | | | |
|---|---|---|---|---|
| 5,047,944 A | * | 9/1991 | Ishikawa et al. | ............ 701/114 |
| 5,927,251 A | * | 7/1999 | Watanabe et al. | ............ 123/399 |
| 6,352,064 B1 | * | 3/2002 | Tomita et al. | ............ 123/396 |
| 6,470,259 B1 | * | 10/2002 | Round | ............ 701/114 |
| 6,619,259 B2 | * | 9/2003 | Tomita et al. | ............ 123/396 |
| 2003/0144778 A1 | * | 7/2003 | Miyano | ............ 701/29 |
| 2003/0221668 A1 | * | 12/2003 | Hashimoto et al. | ............ 123/399 |

FOREIGN PATENT DOCUMENTS

| JP | A-3-70839 | | 3/1991 | |
|---|---|---|---|---|
| JP | 2003-138980 A | * | 5/2003 | ............ F02D/45/00 |
| JP | 2003-155954 A | * | 5/2003 | ............ F02D/45/00 |

* cited by examiner

*Primary Examiner*—Hieu T. Vo
(74) *Attorney, Agent, or Firm*—Nixon & Vanderhye P.C.

(57) ABSTRACT

An electronic throttle control system has a main computer and a sub-computer. The main computer calculates a target throttle angle, and the sub-computer controls a throttle actuator. In the computers, a throttle angle monitor value is set based on an accelerator angle to determine a normal range, and monitor an electronic throttle control operation by determining whether an actual throttle angle is within the normal range. The data characteristic of the monitor value is defined in a logic with which the throttle angle is controlled in the throttle closing direction upon occurrence of a memory retention abnormality.

21 Claims, 6 Drawing Sheets

ELECTRONIC THROTTLE CONTROL SYSTEM HAVING OPERATION MONITOR

CROSS REFERENCE TO RELATED APPLICATION

This application is based on and incorporates herein by reference Japanese Patent Application No. 2002-54089 filed on Feb. 28, 2002.

FIELD OF THE INVENTION

The present invention relates to an electronic throttle control system that has an operation monitoring function.

BACKGROUND OF THE INVENTION

In an electronic throttle control system for an internal combustion engine, the throttle control operation is monitored by determining whether an actual throttle angle (opening position) or a calculated throttle angle is within a predetermined range defined by an upper limit value and a lower limit value. Those limit values are stored in a memory. If the limit values become abnormal due to some defects or failures in the memory, the monitoring cannot be attained properly. Particularly, if flash memory is used to store the limit values, it is more subjected to aging and hence the limit values tend to become abnormal. As a result, determination of abnormality of the throttle control is delayed. If the memory is monitored by the check-sum operation for each calculation of the throttle angle to detect the abnormality, the processing load of the computer increases thereby limiting calculation time of the computer for the throttle control, fuel control and the like.

SUMMARY OF THE INVENTION

It is therefore an object of the present invention to provide an electronic throttle control system, which is capable of monitoring an electronic throttle control operation without increasing processing load of a computer.

According to the present invention, an electronic throttle control system has a memory and a computer. The memory stores various data. The computer calculates a target throttle angle and a throttle angle monitor value from data stored in the memory. The computer performs an electronic throttle control and monitors the electronic throttle control to determine whether an actual throttle angle is within a predetermined range defined by the monitor value. A characteristic of the throttle control value or the monitor value data is that it is defined in a way that it logically causes the throttle angle to be controlled in a throttle closing direction, when a memory retention abnormality occurs.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
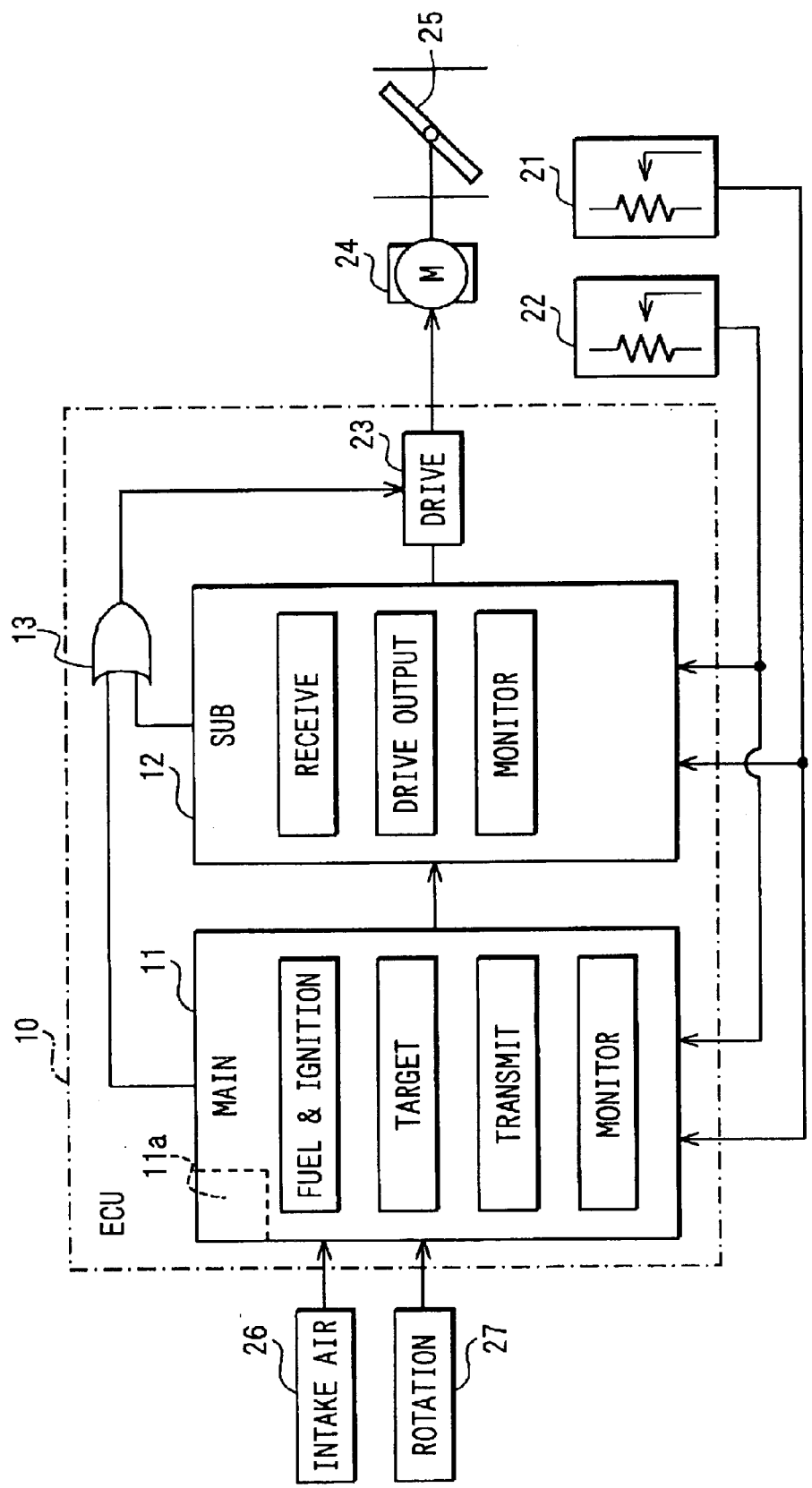
FIG. 1 is a block diagram showing an electronic throttle control system according to an embodiment of the present invention.

Referring to FIG. 1, an electronic throttle control system has an electronic control unit (ECU) 10, which includes a main microcomputer 11 and a sub-microcomputer 12 connected to each other through a communication bus. Each computer 11, 12 is a logic arithmetic circuit, which includes a CPU, a ROM, a RAM, an A/D converter and the like. The main computer 11 has, in addition to fuel and ignition control functions, a throttle control function. In the throttle control function, the computer 11 calculates a target throttle angle, transmits the calculated target throttle angle to the sub-computer 12, and monitors operations of the sub-computer 12. The sub-computer 12 has a throttle drive function, in which the computer 12 receives the target throttle angle, outputs a motor drive signal, and monitors operations of the main computer 11.

The computers 11 and 12 are connected to an accelerator sensor 21, a throttle sensor 22 and other sensors. The computer 11 is further connected to an intake air sensor 26, a rotation sensor 27 and the like. The intake air amount and the engine rotation position detected by the sensors 26 and 27 are used as parameters for controlling fuel injection and spark ignition and engine idling speed as a part of the throttle control.

The computer 11 calculates a target throttle angle based on the accelerator angle signal of the sensor 21, the throttle angle signal of the sensor 22 and the like, and transmits the calculated target angle to the computer 12. The computer 12 performs a throttle angle feedback control based on the target throttle angle and an actual throttle angle indicated by the throttle angle signal of the sensor 22, and outputs a motor drive signal to an H-bridge drive circuit 23. The drive circuit 23 drives the motor 24 in response to the motor drive signal. In this manner, the throttle angle is controlled to the target angle in correspondence with the accelerator angle.

The ECU 10 also has an OR circuit 13, which cuts off a current supply to the motor 24 by the drive circuit 23 when either computer 11 or 12 produces a motor drive stop signal. If the motor drive is stopped, the throttle valve 25 is maintained at a fixed default angle by a mechanical spring (not shown).

Figure 2A:
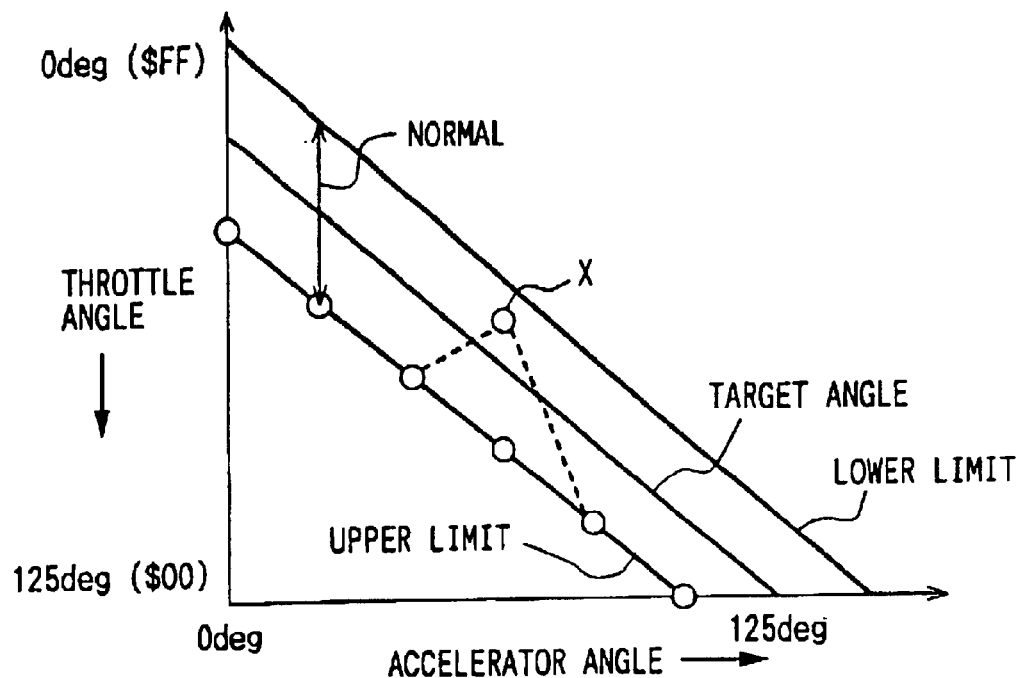
FIGS. 2A and 2B are graphs showing characteristics of a target throttle angle and upper and lower limits relative to an accelerator angle.

The target throttle angle is determined based on the accelerator angle detected by the accelerator sensor 21 as shown by the negative-slope throttle/accelerator control data characteristics depicted in FIG. 2A. Further, negative-slope data for upper and lower limits of the target throttle angle are determined based on the accelerator angle. The normal range of variation of the target throttle angle is thus defined by the upper and lower data limits. The target throttle angle, upper limit and lower limit data are stored in the memory 11a in an inverted magnitude logic (e.g., as the ones-complement) relative to the logically expected memory retention abnormality (abnormal change of data stored in a memory), so that the throttle angle is decreased when a memory retention abnormality occurs.

In a memory in which the memory retention abnormality usually occurs by "0" values changing to "1" values, for instance, the upper limit will become larger than it should be as shown by X in FIG. 2A if a retention abnormality arises in the upper limit. However, with this increased upper limit (X), the upper limit value is changed in fact in the throttle closing direction (i.e., the throttle ange at X is moved upwards towards the zero degree closed throttle position). In this embodiment, the accelerator angle is used as engine load information and the upper and lower limits are used as throttle angle monitor values.

Figure 2B:
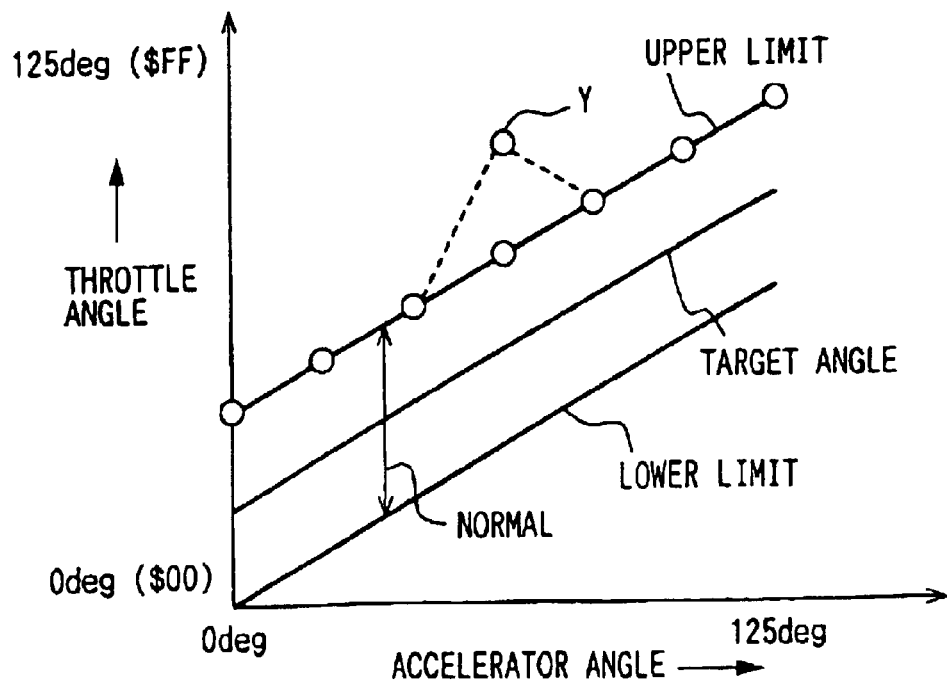

It is possible, contrary to this exemplary embodiment, to store the target throttle angle and limit values so that they increase in the same logic (non-inverted) logic direction as the memory retention abnormality (e.g., as shown in FIG. 2B). However, for instance, here the upper limit will become larger than it should be as shown by Y in FIG. 2B if a retention abnormality arises in the stored upper limit data. In this instance, the increased upper limit (Y) will change the upper limit in the throttle opening direction in fact (e.g., towards 125 degrees of throttle opening). Therefore, it is preferred to set the throttle angle values inverted magnitude logic as shown in FIG. 2A from the standpoint of safety in that the throttle valve 25 is controlled in the throttle closing direction upon occurrence of data retention abnormality.

Figure 3:
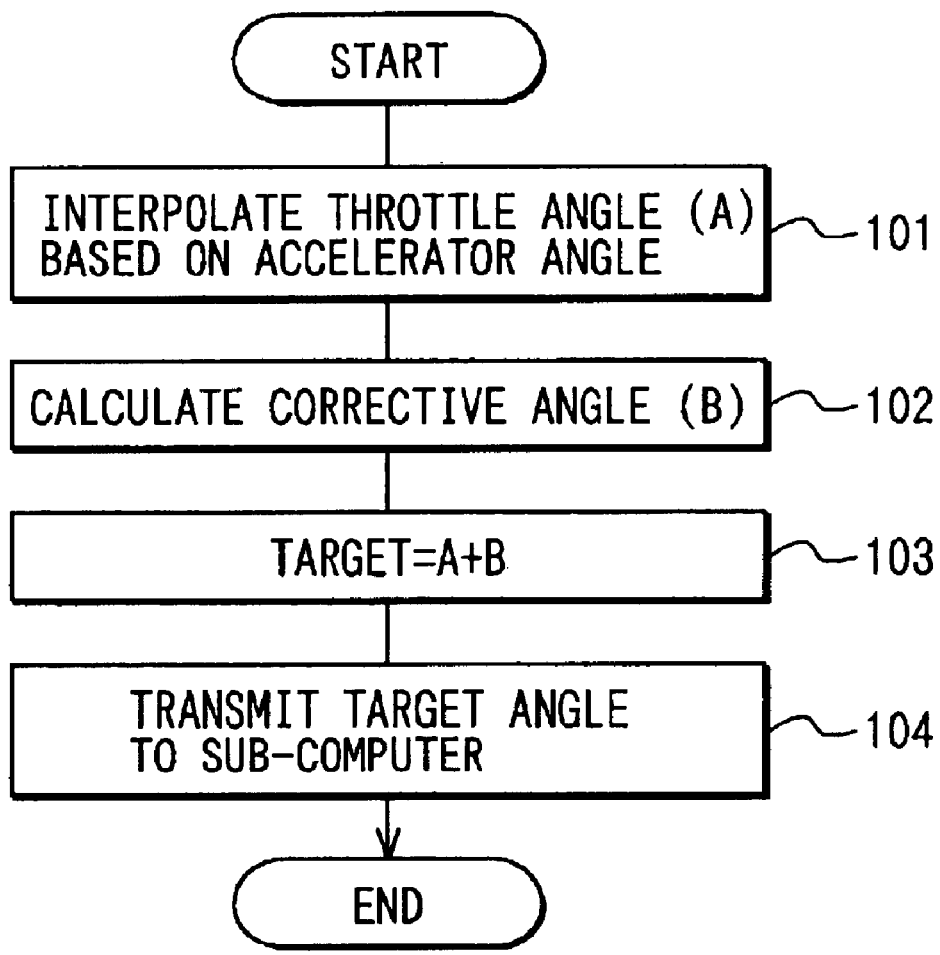
FIG. 3 is a flow chart showing a target throttle angle calculation processing executed in the embodiment.

The main computer 11 is programmed to execute the processing of FIG. 3 at every predetermined time interval thereby to calculate the target throttle angle. The sub-computer 12 is programmed to execute the processing of FIG. 4 at every reception of the calculated target throttle angle from the main computer 11 thereby to output the throttle drive signal.

Referring to FIG. 3, the computer 11 calculates at step 101 a target throttle angle A from the detected accelerator angle by interpolating two values of throttle angle stored as shown in FIG. 2A. The main computer 11 then calculates at step 102 a corrective angle B which is for an engine speed control. The main computer 11 calculates at step 103 a final target throttle angle A+B by adding the calculated two values A and B. Finally, at step 104 the main computer 1 transmits the calculated target throttle angle to the sub-computer 12.

Figure 4:
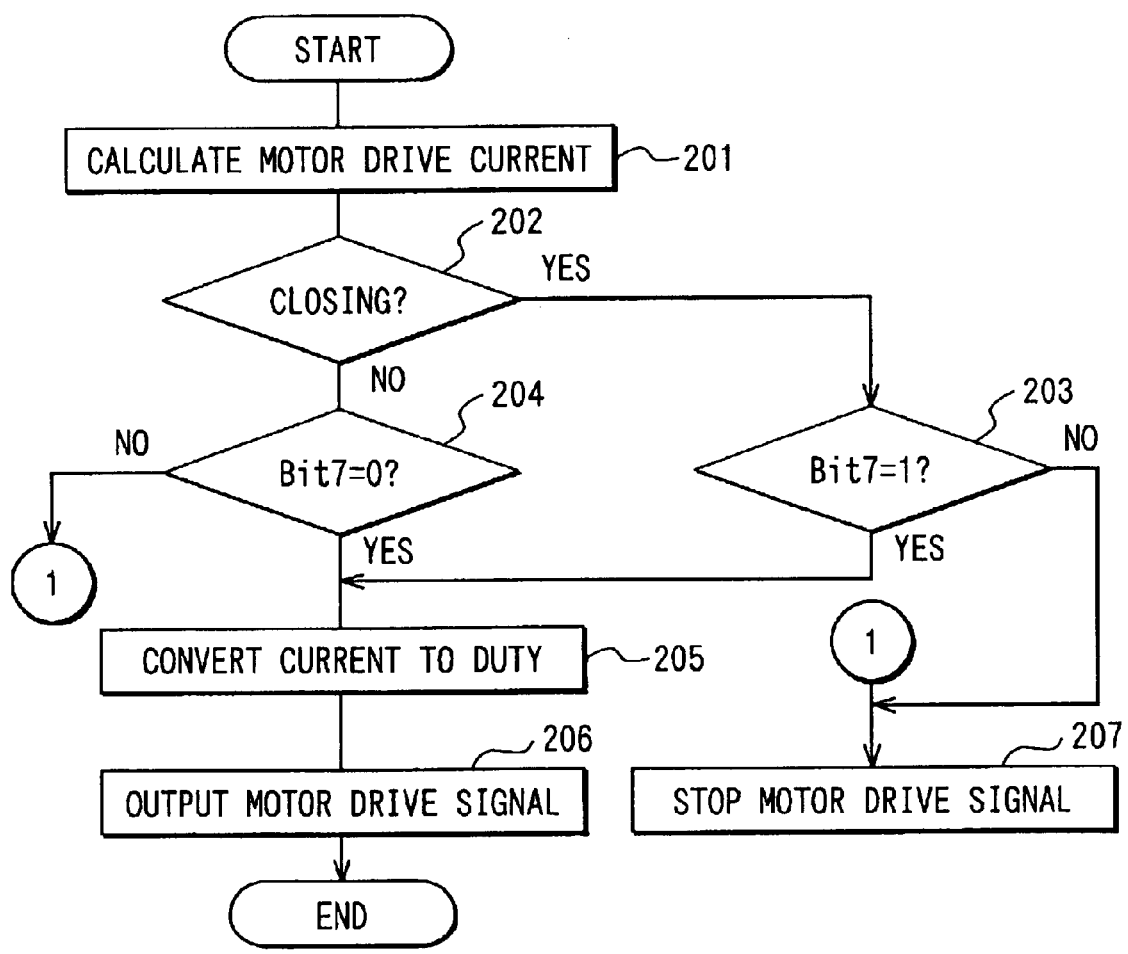
FIG. 4 is a flow chart showing a throttle drive output processing executed in the embodiment.
Figure 5A:
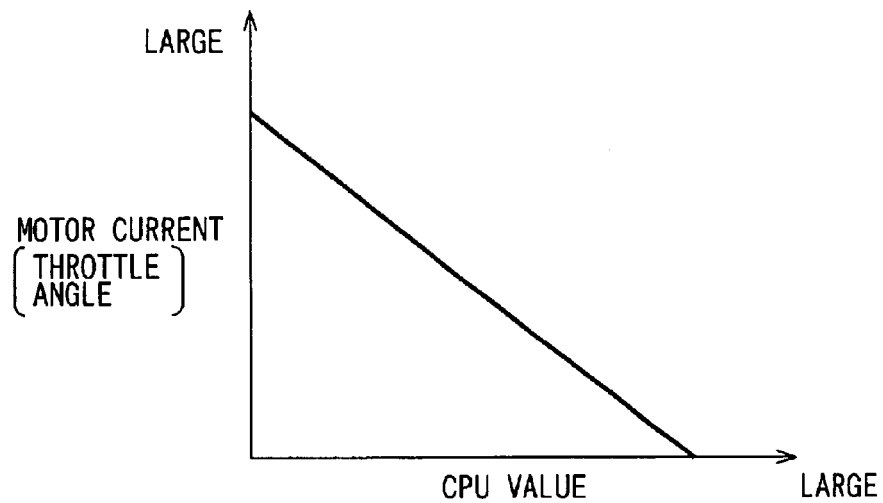
FIGS. 5A and 5B are diagrams showing characteristics of control data in the embodiment.
Figure 5B:
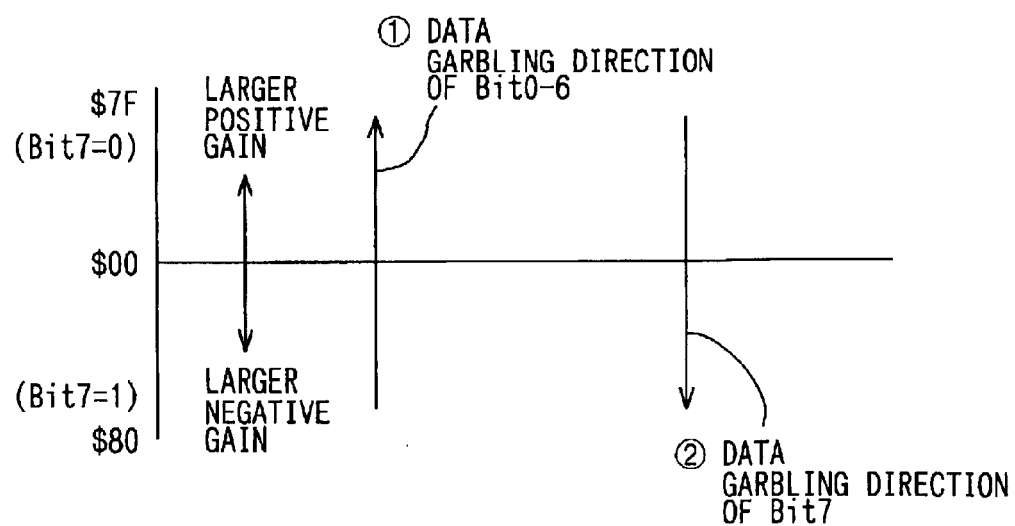

Referring to FIG. 4, the sub-computer 12 calculates at step 201 a motor drive current by P-I-D (proportional-integral-derivative) calculation. That is, the motor drive current is calculated using a proportional value, integral value and derivative value of a deviation of the actual throttle angle from the target throttle angle. The motor drive current is determined to decrease as the CPU calculation value of the sub-computer 12 increases as shown in the negative sloped operating characteristic of FIG. 5A. The sub-computer 12 determines at step 202 whether the present throttle control is in the throttle closing direction or in the throttle opening direction. The sub-computer 12 confirms at steps 203 and 204 whether the throttle control direction (closing and opening) matches with the sign (Bit7) of the gains of the integral term and the derivative term. In this embodiment, sign-added control value (binary data) of 2 bytes are used as the gains of the integral term and the derivative term. The signs are defined by the last bit (Bit7) of a byte. If Bit0 to Bit 6 of a gain data term (0→4) becomes garbled due to memory retention abnormality, this gain changes in a direction that the positive gain becomes large in the direction shown with ① in FIG. 5B. If the sign Bit7 itself of the gain data term (0→1) becomes garbled due to the memory retention abnormality, on the other hand, this gain changes in a direction that the negative gain becomes large as shown with ② in FIG. 5B.

The sub-computer 12 determines the memory retention to be normal, if the throttle control is in the throttle closing direction and Bit7 of the gain is 1 (YES at step 203), or if the throttle control is in the throttle opening direction and Bit7 of the gain is 0 (YES at step 204). In this instance, the sub-computer 12 converts the calculated motor drive current to a corresponding control duty at step 205 and outputs this control duty as the motor drive signal.

If the determination at steps 203 or 204 results in NO, the sub-computer 12 outputs a motor drive stop signal to the OR circuit 13 at step 207 thereby to stop current supply to the motor 24. As a result, the throttle control system is put in a limp-home mode and predetermined fail-safe processing is performed.

Figure 6:
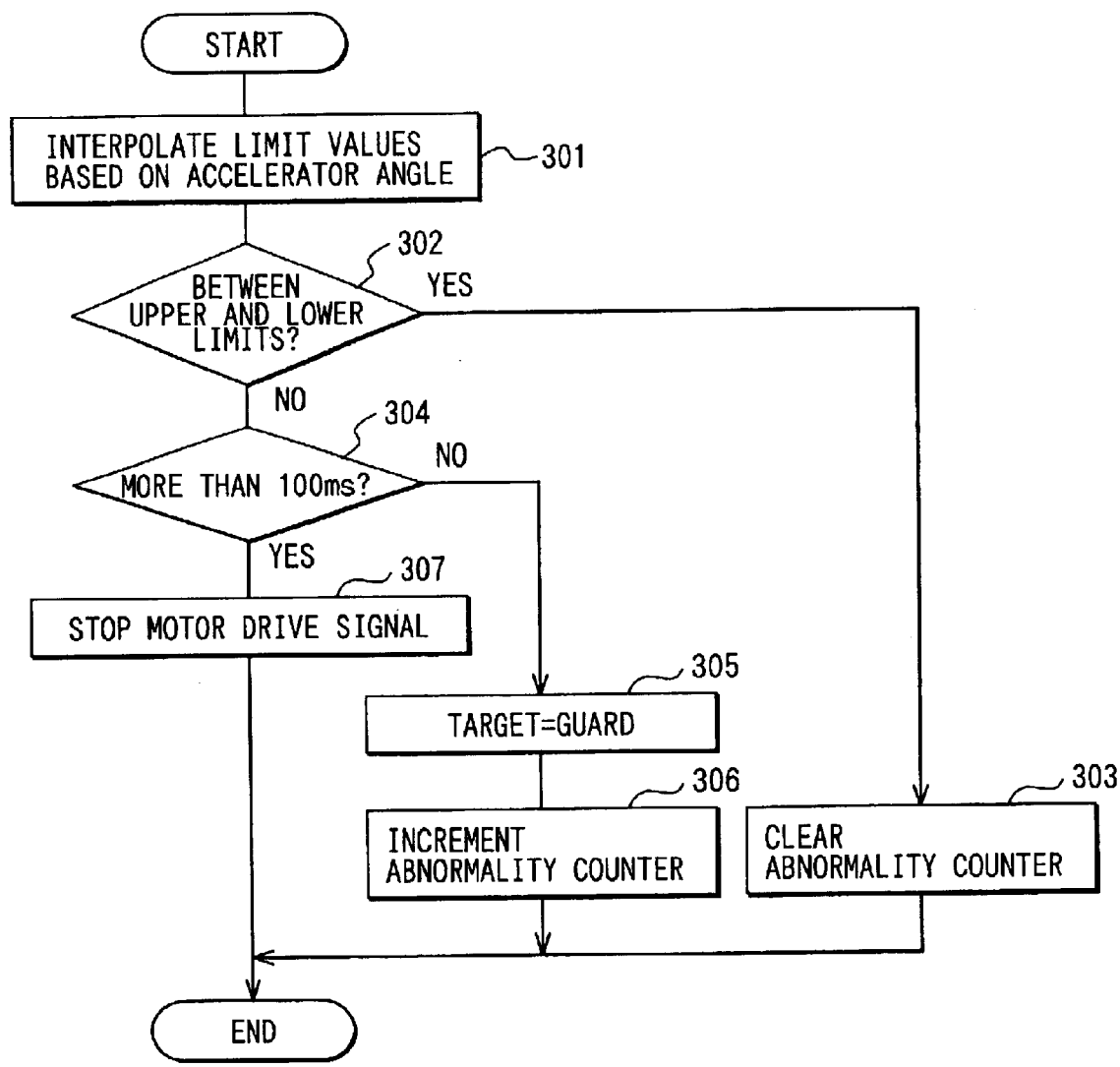
FIG. 6 is a flow chart showing mutual monitoring processing executed in the embodiment.

The main computer 11 and the sub-computer 12 are also programmed to execute the processing shown in FIG. 6 to perform monitoring operations each other. This processing is executed at every calculation or reception of the target throttle angle.

At step 301, the upper limit and the lower limit of the target throttle angle corresponding to the detected accelerator position are calculated by interpolating two upper limit values and two lower limit values stored as shown in FIG. 2, respectively. It is then determined at step 302 whether the actual throttle angle detected by the throttle angle sensor 22 at this moment is within the normal range defined by the calculated upper and lower limits.

If the actual throttle angle is within the normal range (YES at step 302), an abnormality counter which measures an interval of continuation of abnormality is cleared at step 303. If it is not within the normal range (NO), it is determined at step 304 whether the count of the abnormality counter is more than a predetermined reference, that is, the abnormality continues more than 100 ms. If it is less than 100 ms (NO), the calculated throttle angle is changed and restricted to corresponding one of the upper limit and the lower limit as a guard at step 305. Then at step 306, the count of the abnormality counter is incremented.

If the abnormality continues more than 100 ms (YES at step 304), the motor drive stop signal is output to the OR circuit 13 thereby to stop current supply to the motor 24. Thus, the throttle control system is put in the limp-home mode, and the predetermined fail-safe processing is performed.

In case that the main computer 11 executes the monitoring processing of FIG. 6, it results in monitoring whether the sub-computer 12 performs the feedback calculation operation of the throttle angle and motor drive operation properly. In case that the sub-computer 12 executes the monitoring processing of FIG. 6, it results in monitoring whether the main computer 11 performs the target throttle angle calculation properly.

It is to be noted in the above embodiment that the data characteristics of the throttle target angle, upper limit and lower limit are set to drive the throttle valve 25 in the closing direction upon occurrence of the memory retention abnormality. Therefore, the throttle valve can be restricted from abnormally driven in the throttle opening direction. Further, monitoring of the memory by check-sum calculation is not necessitated so frequently, and hence calculation load of the computers 11 and 12 can be reduced.

The motor current is decreased as the control value (CPU output value) increases, when the motor current is calculated from the CPU output value. As a result, the throttle angle is restricted from increasing due to garbling of data from 0 to 1 (0→1). In addition, since the gains of the feedback control executed by the sub-computer 12 is signed data, the retention abnormality can be determined quickly from the relation between the sign (Bit7) and the throttle opening/closing direction.

As the main computer 11 and the sub-computer 12 monitors each other's operation, reliability of the overall monitoring operation is improved. This is effective to diagnose abnormality later.

The above embodiment may be modified in many ways without departing from the spirit of the invention. For instance, only one of the upper limit and the lower limit may be used as the guard for the target throttle angle. The throttle control may be monitored by determining whether the actual throttle angle is within a normal range which is defined based on the target throttle angle. In this instance, the data characteristics of the target throttle angle is set so that the throttle valve is driven in the closing direction when the memory retention abnormality occurs.

What is claimed is:

1. An electronic throttle control system comprising:

a memory storing data; and a computer adapted to perform an electronic throttle control by calculation of at least one throttle angle monitor value using data from of the memory and to monitor the electronic throttle control to determine whether an actual throttle angle is within a predetermined range defined by a throttle angle monitor value, wherein a characteristic of the throttle angle monitor value data is defined so that it causes the throttle angle to be controlled in a throttle closing direction when a memory retention abnormality occurs.

2. An electronic throttle control system as in claim 1, wherein:

the throttle angle monitor value data is stored as its ones-complement value.

3. An electronic throttle control system as in claim 1, wherein:

the computer is adapted to calculate a target throttle angle from data of the memory based on engine conditions to control the throttle angle to the target throttle angle in performing the electronic throttle angle in performing electronic throttle control; and a characteristic of the target throttle data angle is defined such that the throttle angle is controlled in the throttle closing direction when the memory retention abnormality occurs.

4. An electronic throttle control system as in claim 3, wherein:

the computer is adapted to calculate a throttle control value from a deviation of the actual throttle angle from the target throttle angle and to calculate throttle drive current for a throttle actuator; and a relationship between the throttle control value and the throttle drive current is determined so that the throttle drive current decreases as the throttle control value increases.

5. An electronic throttle control system as in claim 3, wherein:

the computer includes a main computer adapted to calculate the target throttle angle and a sub-computer adapted to control a throttle actuator based on target throttle angle data received from the main computer; and both the main computer and the sub-computer monitor whether the actual throttle angle is within the predetermined range.

6. A method for operating an electronic throttle control system, said method comprising:

storing data; and performing electronic throttle control by calculation of at least one throttle angle monitor value using data from the memory and monitoring the electronic throttle control to determine whether an actual throttle angle is within a predetermined range defined by a throttle angle monitor value, wherein a characteristic of the throttle angle monitor value data is defined so that it causes the throttle angle to be controlled in a throttle closing direction when a memory retention abnormality occurs.

7. A method as in claim 6 wherein: the throttle angle monitor value data is stored as its ones-complement.

8. A method as in claim 6 wherein:

a target throttle angle is calculated using data from the memory based on engine conditions to control the throttle angle to the target throttle angle in performing electronic throttle control; and a characteristic of the target throttle angle data is defined such that the throttle angle is controlled in the throttle closing direction when the memory retention abnormality occurs.

9. A method as in claim 8 wherein:

a throttle control value is calculated from a deviation of the actual throttle angle from the target throttle angle and throttle drive current is calculated for a throttle actuator; and a relationship between the throttle control value and the throttle drive current is determined so that the throttle drive current decreases as the throttle control value increases.

10. A method as in claim 8 wherein:

a main computer calculates the target throttle angle and a sub-computer controls a throttle actuator based on target throttle angle data received from the main computer; and both the main computer and the sub-computer monitor whether the actual throttle angle is with the predetermined range.

11. An electronic throttle control system comprising:

a memory storing data in correspondence with an engine condition; and a computer adapted to control a throttle angle to a target throttle angle calculated from data of the memory and to monitor a throttle control value to determine whether an actual throttle angle is within a predetermined range encompassing the target throttle, wherein a characteristic of the target throttle angle data causes the throttle angle is to be controlled in a throttle closing direction, when a memory retention abnormality occurs.

12. An electronic throttle control system as in claim 11, wherein:

the stored target throttle angle data is inverted in magnitude relative to an expected memory retention abnormality.

13. An electronic throttle control system as in claim 11, wherein:

the computer is adapted to calculate a throttle control value from a deviation of the actual throttle angle from the target throttle angle and to calculate a throttle drive current for a throttle actuator; and a relationship between the throttle control value and the throttle drive current is determined so that the throttle drive current decreases as the throttle control value increases.

14. An electronic throttle control system as in claim 11, wherein:
  the computer includes a main computer adapted to calculate the target throttle angle and a sub-computer for adapted to control a throttle actuator based on target throttle angle data received from the main computer; and
  both the main computer and the sub-computer monitor whether the actual throttle angle is within the predetermined range.

15. A method for operating an electronic throttle control system, said method comprising:
  storing data in a memory corresponding with an engine condition; and controlling a throttle angle to a target throttle angle calculated using data from the memory and monitoring a throttle control value to determine whether an actual throttle angle is within a predetermined range encompassing the target throttle angle,
  wherein a characteristic of the target throttle angle data causes the throttle angle to be controlled in a throttle closing direction when a memory retention abnormality occurs.

16. A method as in claim 15 wherein:
  the stored target throttle angle data is inverted in magnitude relative to an expected memory retention abnormality.

17. A method as in claim 15 wherein:
  a throttle control value is calculated from a deviation of the actual throttle angle from the target throttle angle and throttle drive current is calculated for a throttle actuator; and
  a relationship between the throttle control value and the throttle drive current is determined so that the throttle drive current decreases as the throttle control value increases.

18. A method as in claim 15 herein:
  a main computer calculates the target throttle angle and a sub-computer controls a throttle actuator based on target throttle angle data received from the main computer; and
  both the main computer and the sub-computer monitor whether the actual throttle angle is with the predetermined range.

19. An electronic throttle control system comprising:
  a memory storing predetermined throttle angle limit data which decreases in magnitude as a function of increasing accelerator angle such that memory retention abnormalities causing stored zero-valued bits to change to one-valued bits thus possibly increasing the magnitude of limit data that will nevertheless correspond to a decreased throttle angle; and
  a computer which is adapted to control and monitor throttle angle as a function of accelerator angle using said stored limit data to restrain the permissible controlled throttle angle.

20. A method for operating an electronic throttle control system, said method comprising:
  controlling throttle angle as a function of accelerator angle while being restrained to conform with predetermined throttle angle limits corresponding to limit data stored in a memory which may experience memory retention abnormalities causing stored zero-valued bits to change to one-valued bits over time; and
  storing said limit data in said memory such that the magnitude of stored limit data decreases as a function of increasing accelerator angle.

21. A method as in claim 20 wherein said limit data is stored in memory as its ones-complement value.

* * * * *